(12) United States Patent
Birrell et al.

(10) Patent No.: US 6,718,321 B2
(45) Date of Patent: Apr. 6, 2004

(54) WEB-BASED ELECTRONIC MAIL SERVER APPARATUS AND METHOD USING FULL TEXT AND LABEL INDEXING

(75) Inventors: Andrew D. Birrell, Los Altos, CA (US); Edward P. Wobber, Menlo Park, CA (US); Michael Schroeder, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 639 days.

(21) Appl. No.: 09/999,902

(22) Filed: Feb. 6, 2001

(65) Prior Publication Data

US 2003/0135555 A1 Jul. 17, 2003

Related U.S. Application Data

(63) Continuation of application No. 08/876,604, filed on Jun. 16, 1997, now Pat. No. 6,185,551.

(51) Int. Cl.[7] .............................................. G06F 17/30
(52) U.S. Cl. .............................................. 707/2; 707/1
(58) Field of Search ................................ 707/1, 2, 3, 4, 707/7, 10, 100, 101, 102, 104.1; 345/326, 840; 705/26, 28, 50; 709/206

(56) References Cited

U.S. PATENT DOCUMENTS

| | | | |
|---|---|---|---|
| 4,870,571 A | 9/1989 | Frink ......................... 364/200 |
| 4,962,532 A | 10/1990 | Kasiraj et al. ................ 380/25 |
| 5,283,856 A | 2/1994 | Gross et al. .................. 395/51 |
| 5,333,266 A | 7/1994 | Boaz et al. ................. 395/200 |
| 5,418,908 A | 5/1995 | Keller et al. ................ 395/200 |
| 5,426,594 A | 6/1995 | Wright et al. ........... 354/514 R |
| 5,479,411 A | 12/1995 | Klein ....................... 370/110.1 |
| 5,481,698 A | 1/1996 | Itoh et al. .............. 395/185.01 |
| 5,483,651 A * | 1/1996 | Adams et al. ................. 707/1 |
| 5,506,984 A | 4/1996 | Miller ......................... 707/10 |
| 5,530,852 A | 6/1996 | Meske, Jr. et al. .......... 395/600 |
| 5,572,643 A | 11/1996 | Judson ........................ 395/793 |
| 5,617,541 A | 4/1997 | Albanese et al. ....... 395/200.13 |
| 5,619,648 A | 4/1997 | Canale et al. .......... 395/200.01 |
| 5,623,600 A | 4/1997 | Ji et al. .................. 395/187.01 |
| 5,675,507 A | 10/1997 | Bobo, II ................ 395/200.36 |
| 5,708,825 A | 1/1998 | Sotomayor ................... 395/762 |
| 5,717,913 A | 2/1998 | Driscoll ....................... 395/605 |
| 5,734,903 A | 3/1998 | Saulpaugh et al. ......... 395/683 |
| 5,742,769 A | 4/1998 | Lee et al. .............. 395/200.36 |
| 5,745,890 A | 4/1998 | Burrows ....................... 707/3 |
| 5,764,899 A | 6/1998 | Eggleston et al. .......... 709/203 |

(List continued on next page.)

OTHER PUBLICATIONS

Mark R. Brown, Special Edition Using Netscape 2, pp. 368–369, 1995.

C.D. Whittington, "Annotation Systems: A Review", Research Report No. RR/96/202, pp. 1–14, Dec. 23, 1996.

Lawton and Smith, "The Knowledge Weasel Hypermedia Annotation System", Hypertext '93 Proceedings, pp. 106–117, Nov. 1993.

Goldberg et al.; "Using Collaborative Filtering to Weave an Information Tapestry", Communications of the ACM, vol. 35, No. 12, pp. 61–70, Dec. 1992.

*Primary Examiner*—Diane D. Mizrahi
*Assistant Examiner*—Apu Mofiz

(57) ABSTRACT

In a computerized distributed mail system, a plurality of client computers are connected to each other via a network. Each client computer is configured to execute client mail application programs. A mail service system is also connected to the network. The system is for executing server mail programs on server computers. The mail service system includes an index server for storing mail messages in message files, and for storing a full-text index of the mail messages. In addition, the system includes means for accessing the mail messages by the plurality of client computers by searching the full-text index using queries.

25 Claims, 10 Drawing Sheets

U.S. PATENT DOCUMENTS

| | | | |
|---|---|---|---|
| 5,765,033 A | 6/1998 | Miloslavsky | 395/200.36 |
| 5,765,178 A | 6/1998 | Tanaka | 707/526 |
| 5,771,355 A | 6/1998 | Kuzma | 395/200.62 |
| 5,781,901 A | 7/1998 | Kuzma | 707/10 |
| 5,784,608 A | 7/1998 | Meske, Jr. et al. | 707/2 |
| 5,790,793 A | 8/1998 | Higley | 709/218 |
| 5,793,970 A | 8/1998 | Fakes et al. | 395/200.46 |
| 5,794,039 A | 8/1998 | Guck | 395/683 |
| 5,796,948 A | 8/1998 | Cohen | 395/200.36 |
| 5,805,298 A | 9/1998 | Ho et al. | 358/402 |
| 5,809,218 A | 9/1998 | Kastenholz et al. | 395/115 |
| 5,815,663 A | 9/1998 | Uomini | 395/200.49 |
| 5,822,527 A | 10/1998 | Post | 395/200.36 |
| 5,826,269 A | 10/1998 | Hussey | 707/10 |
| 5,835,084 A | 11/1998 | Bailey et al. | 345/326 |
| 5,873,079 A | 2/1999 | Davis, III et al. | 707/3 |
| 5,884,246 A | 3/1999 | Boucher et al. | 704/2 |
| 5,903,723 A | 5/1999 | Beck et al. | 707/10 |
| 5,909,679 A | 6/1999 | Hall | 707/4 |
| 6,006,227 A | 12/1999 | Freeman et al. | 707/7 |
| 6,009,462 A | 12/1999 | Birrell et al. | 709/206 |
| 6,021,409 A | 2/2000 | Burrows | 707/102 |
| 6,029,164 A * | 2/2000 | Birrell et al. | 707/3 |
| 6,092,101 A * | 7/2000 | Birrell et al. | 709/206 |
| 6,185,551 B1 * | 2/2001 | Birrell et al. | 707/3 |
| 6,189,026 B1 * | 2/2001 | Birrell et al. | 709/206 |

* cited by examiner

WEB-BASED ELECTRONIC MAIL SERVER APPARATUS AND METHOD USING FULL TEXT AND LABEL INDEXING

This is a continuation of application Ser. No. 08/876,604 filed Jun. 16, 1997 now U.S. Pat. No. 6,185,551.

FIELD OF THE INVENTION

The present invention relates generally to electronic mail, and more particularly to electronic mail messaging in a distributed computer system.

BACKGROUND OF THE INVENTION

With the advent of large scale distributed computer systems such as the Internet, the amount of information which has become available to users of computer systems has exploded. Among this information is electronic mail (e-mail). With the improvements in means for composing and distributing written messages, the amount of e-mail traffic on the Internet has surged. It is not unusual for an active Internet user to be exposed to tens of thousands of e-mail messages a year.

As an advantage, the Internet allows users to interchange useful information in a timely and convenient manner. However, keeping track of this huge amount of information has become a problem. As an additional advantage, the Internet now allows users to exchange information in a number of different presentation modalities, such as text, audio, and still and moving images. Adapting e-mail systems to organize such complex information, and providing efficient means to coherently retrieve the information is not trivial.

As a disadvantage, Internet users may receive junk-mail whenever they send to mailing lists or engage in news groups. There are numerous reported incidents where specific users have been overwhelmed by thousands of unwanted mail messages. Current filtering systems are inadequate to deal with this deluge.

Known distributed systems for composing and accessing e-mail are typically built around protocols such as IMAP, POP, or SMTP. Typically, users must install compatible user agent software on any client computers where the mail service is going to be accessed. Often, a significant amount of state information is maintained in the users' client computers. For example, it is not unusual to store the entire mail database for a particular user in his desk-top or lap-top computer. Normally, the users explicitly organize mail messages into subject folders. Accessing mail generally involves shipping entire messages over the network to the client computer.

Such systems are deficient in a number of ways. Most computers that a user will encounter will not be configured with user agents compatible with the user's mail service. Often, a user's state is captured in a specific client computer, which means that work cannot proceed when the user moves to another computer. Managing large quantities of archival mail messages by an explicit folder organization is difficult for most users. Accessing mail over a low bandwidth network tends to be unsatisfactory.

Therefore, it is desired to provide a mail system that overcomes these deficiencies.

SUMMARY OF THE INVENTION

Provided is a distributed mail system where a plurality of client computers are connected to each other and a mail service system via a network. Each client computer is configured to execute client mail application programs. The mail service system is for executing server mail programs on server computers. The mail service system includes an index server for storing mail messages in message files, and for storing a full-text index of the mail messages. In addition, the system includes means for accessing the mail messages by the plurality of client computers by searching the full-text index using queries.

DETAILED DESCRIPTION OF THE PREFERRED EMBODIMENT

System Overview

Figure 1:
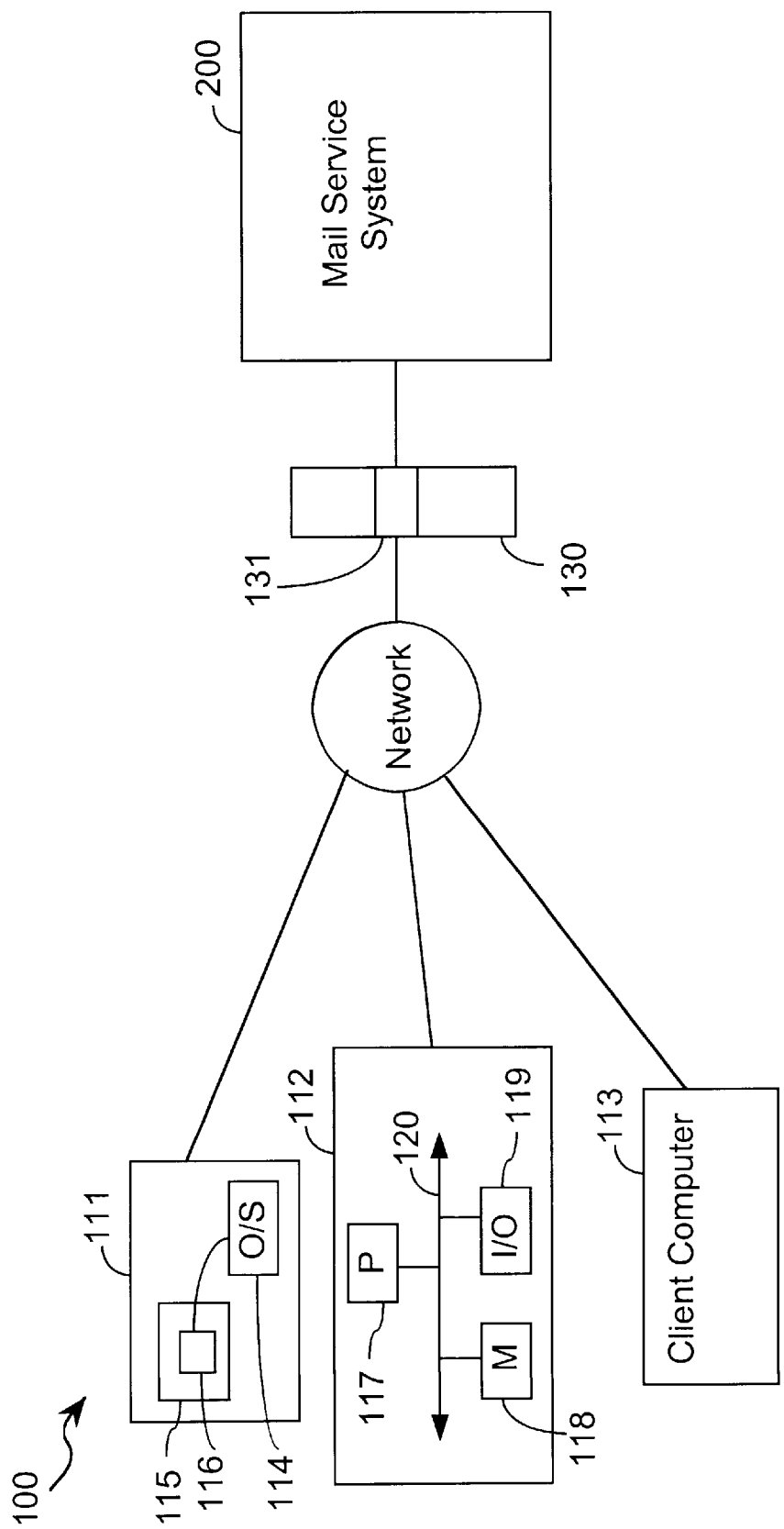
FIG. 1 is a block diagram of an arrangement of a distributed mail service system which uses the invention.

In FIG. 1, an arrangement 100 provides a distributed mail service having features according to the invention. In FIG. 1, one or more client computers 111–113 are connected via a network 120 to a mail service system 200 described in greater detail below.

Client Computers

The client computers 111–113 can be workstations, personal computers, lap-tops, palm-tops, network computers (NCs), or any other similarly configured computer system. The clients 111–113 can be owned, borrowed, or rented. It should be noted that in practice, the clients 111–113 can potentially be any of the millions of personal computer systems that are currently extant and connected to a network. Over time, a user may user different client computers at different locations.

As shown for computer 111, each client computer executes standard operating system software (O/S) 114, e.g., Unix (™), Windows 95 (™), MacOS (™) or NT (™). The O/S 114 is used to execute application software programs. One of the application programs is a Web browser 115. The Web browser can be Netscape Navigator (™), Microsoft (™) Explorer (™), Hot Java (™), and other similar browsers.

The functionality of the browser 115 can be extended by forms, applets, and plug-ins generally indicated by reference numeral 116. In the preferred embodiment, the browser extensions are in the form of client mail application programs described in greater detail below. The client mail application programs are downloaded over the network 120 from the mail service system 200. The extensions can be implemented using HTML, JavaScript, Java applets, Microsoft ActiveX, or combinations thereof to provided maximum portability.

As shown for computer 112, the client includes one or more processors (P) 117, memories 118 (M), input/output interfaces (I/O) 119 connected to each other by a bus 120. The processors 117 can implement CISC or RISC architectures in 32, 64, or other bit length data structures. The memories 118 can include solid state dynamic random access memory (DRAM), and fixed and removable memories such as hard disk drives, CD-ROMs, diskettes, and tapes. The I/O 119 can be connected to input devices such as a keyboard and a mouse, and output devices such as a display and a printer. The I/O 119 can also be configured to connect to multi-media devices such as sound-cards, image processors, and the like. The I/O also provides the necessary communications links to the network 120.

Network

In the preferred embodiment, the network 120 includes a large number of public access points, and communications are carried out using Internet Protocols (IP). Internet protocols are widely recognized as a standard way of communicating data. Higher level protocols, such as HTTP and FTP, communicate at the application layer, while lower level protocols, such as TCP/IP operate at the transport and network levels.

Part of the Internet includes a data exchange interface called the World-Wide-Web, or the "Web" for short. The Web provides a way for formatting, communicating, interconnecting, and addressing data according to standards recognized by a large number of software packages. For example, using the Web, multi-media (text, audio, and video) data can be arranged as Web pages. The Web pages can be located by the browser 115 using Uniform Resource Locators (URLs).

A URL specifies the exact location of a Web-based resource such as a server or data record. The location can include domain, server, user, file, and record information, e.g., HTTP://www.digital.com/~userid/file.html/~record. " An Internet service can be used to send and receive mail messages. For example, a mail message can be sent mail to the address "jones@mail.digital.com" using the SMTP protocol. As an advantage, the Internet and the Web allow users, with only minor practical limitations, to exchange data no matter where they are, using any type of computer equipment.

Intranet

The mail service system 200 includes one or more server computers. Usually, the system 200 is part of some private network (intranet) connected to the public network 120. Typically, an intranet is a distributed computer system operated by some private entity for a selected user base, for example, a corporate network, a government network, or some commercial network.

Firewall

In order to provide security protection, communications between components of the Internet and the intranet are frequently filtered and controlled by a firewall 130. The purpose of the firewall 130 is to enforce security policies of the private intranet. One such policy may be "never allow a client computer to directly connect to an intranet server via the public portion of the Internet." The firewall, in parts, protects accesses to critical resources (servers and data) of the intranet.

Only certain types of data traffic are allowed to cross the firewall 130. Penetration of the firewall 130 is achieved by a tunnel 131. The tunnel 131 typically performs a secure challenge-and-response sequence before access is allowed. Once the identity of a user of a client has been authenticated, the communications with components of the intranet are performed via a proxy server, not shown, using secure protocols such SSL and X.509 certificates.

Mail Service System

The mail service system 200 can be implemented as one or more server computers connected to each other either locally, or over large geographies. A server computer, as the name implies, is configured to execute server software programs on behalf of client computers 111–113. Sometimes, the term "server" can mean the hardware, the software, or both because the software programs may dynamically be assigned to different servers computers depending on load conditions. Servers typically maintain large centralized data repositories for many users.

In the mail system 200, the servers are configured to maintain user accounts, to receive, filter, and organize mail messages so that they can readily be located and retrieved, no matter how the information in the messages is encoded.

General Operation

During operation of the arrangement 100, users of the client computers 111–112 desire to perform e-mail services. These activities typically include composing, reading, and organizing e-mail messages. Therefore, the client computers can make connections to the network 120 using a public Internet service provide (ISP) such as AT&T (™) or Earthlink (™). Alternatively, a client computer can be connected to the Internet at a "cyber-cafe" such as Cybersmith (™), or the intranet itself via a local area network. Many other connection mechanisms can also be used. Once a connection has been made, a user can perform any mail service.

As an advantage, structural and functional characteristics of the arrangement 100 include the following. Mail services of the system 200 are available through any Web-connected client computer. The users of the services can be totally mobile, moving among different clients at will during any of the mail activities. Composition of a mail message can be started on one client, completed on another, and sent from a yet another computer.

These characteristics are attained, in part, by never locking a user's state in one of the client computers in case access is not be possible at a later time. This has the added benefit that a client computer's local storage does not need to be backed-up because none of the important data reside there. In essence, this is based on the notion that the operating platform is the Web, thus access to mail service system via the Web is sufficient to access user data.

The service system will work adequately over a wide range of connectivity bandwidths, even for mail messages including data in the form of multi-media. Message retrieval from a large repository is done using queries of a full-text index without requiring a complex classification scheme.

The arrangement 100 is designed to incorporate redundancy techniques such as multiple access paths, and replicated files using redundant arrays of independent disks (RAID) technologies.

Mail Service System

Figure 2:
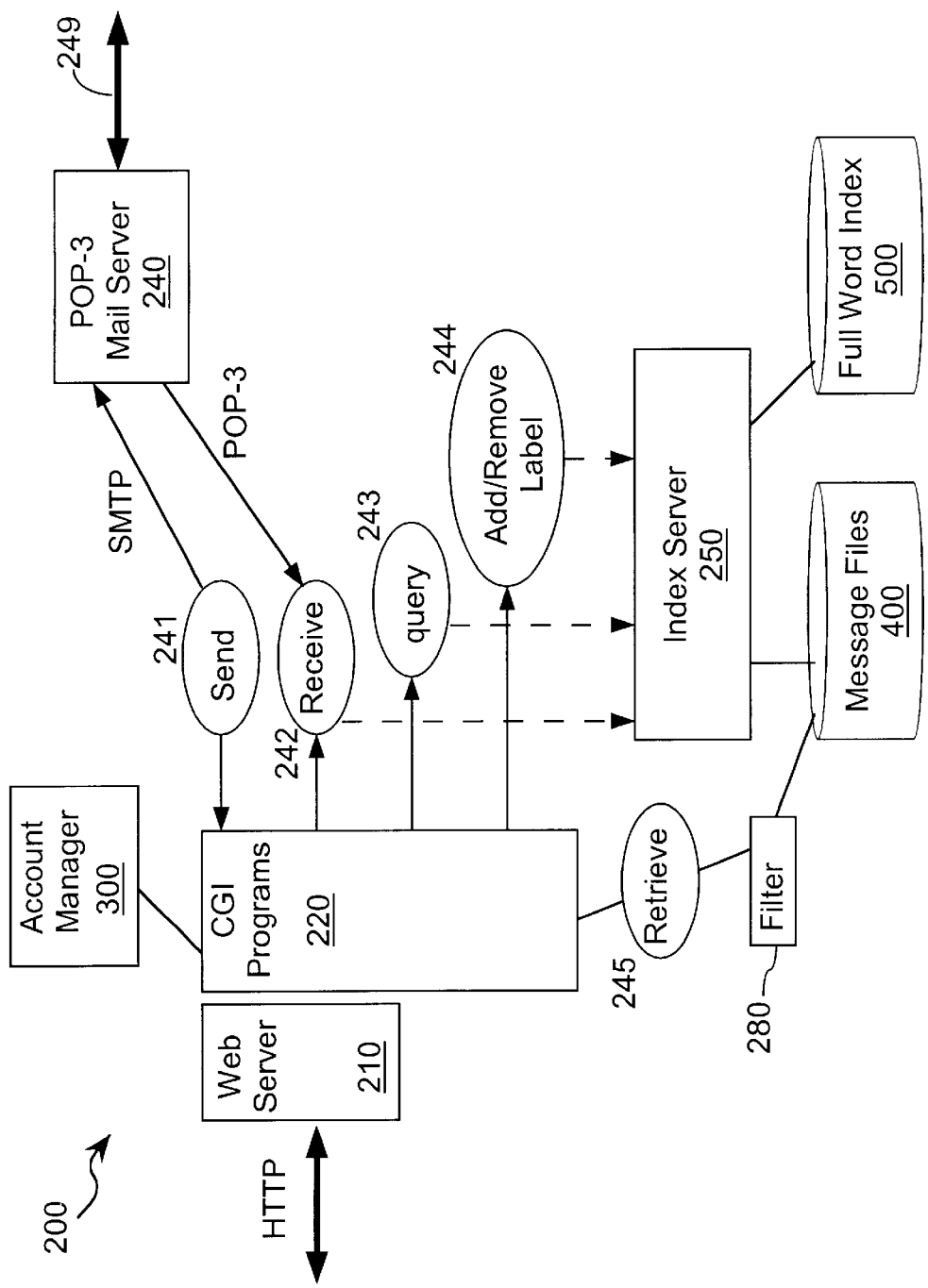
FIG. 2 is a block diagram of a mail service system of the arrangement of FIG. 1.

As shown in FIG. 2, the mail service system includes the following components. The system 200 is constructed to have as a front-end a Web server 210. The server 210 can be the "Apache" Web server available from the WWW Consortium. The Web server 210 interacts with a back-end common gateway interface (CGI) programs 220. The programs interface with an account manager 300, a STMP mail server 240, and an index server 250. The CGI programs 220 are one possible mechanism. The programs could also be implemented by adding the code directly to the Web server 210, or by adding extensions to the NSAPI from Netscape (™).

As shown in FIG. 2, the mail service system includes the following components. The system 200 is constructed to have as a front-end a Web server 210. The server 210 can be the "Apache" Web server available from the WWW Consortium. the Web server 210 interacts with a back-end common gateway interface (CGI) programs 220. The programs interface with an account manager 300, a SMTP mail server 240, and an index server 250. The CGI programs 220 are one possible mechanism. The programs could also be implemented by adding the code directly to the Web server 210, or by adding extensions to the NSAPI from Netscape (™).

The top-level functions of the system 200 include send mail 241, receive mail 242, query index 243, add/remove label to/from mail 244, and retrieve mail 245. Different servers can be used for the processes which implement the functions 241–245.

The account manager 300 maintains account information. The mail server 240 is used to send and receive mail messages to and from other servers connected to the network. The index server 250 maintains mail messages in message files 400, and a full-text index 500 to messages. The CGI programs 220 also interact with the messages files 400 via a filter 280 for mail message retrieval.

The Web server 210 can be any standard Web server that implements the appropriate protocols to communicate via the network using HTTP protocols 201, for example the Apache server. The CGI back-end programs 220 route transactions between the Web server 210 and the operational components of the mail service system. The CGI back-end 220 can be implemented as C and TCL programs executing on the servers.

Account Manager

Figure 3:
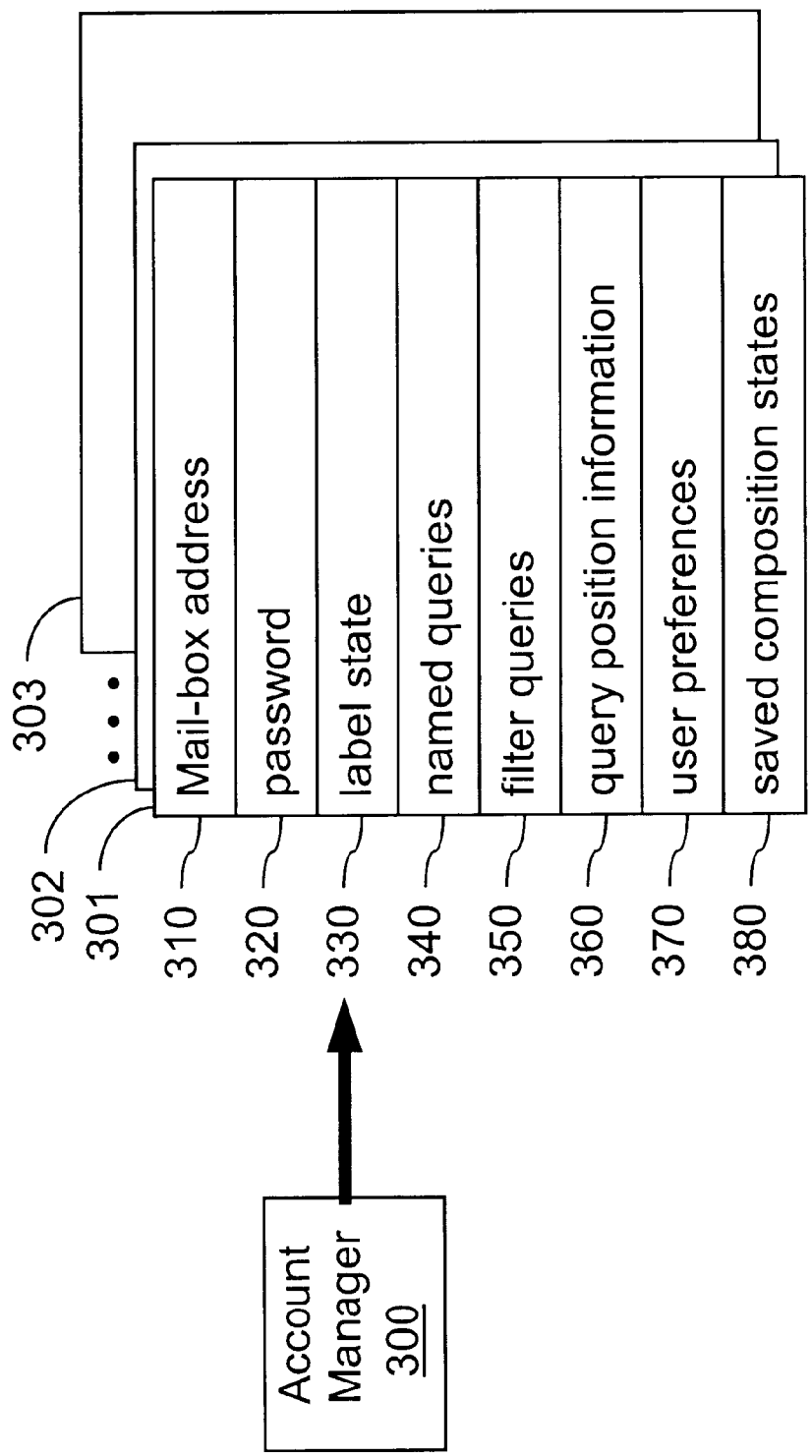
FIG. 3 is a block diagram of an account manager and account records of the system of FIG. 2.

As shown in FIG. 3, the account manager 300 maintains account information 301–303 for users who are allowed to have access to the mail system 200. Information maintained for each account can include: mail-box address 310, e.g., in the form of a "Post Office Protocol" (POP-3) address, user password 320, label state 330, named queries 340, filter queries 350, query position information 360, user preferences 370, and saved composition states 380. The full meaning and use of the account information will become apparent as other components of the system 200 are described.

As an introduction, passwords 320 are used to authenticate users. Labels 330 are used to organize and retrieve mail messages. Labels can be likened to annotated notes that can be added and removed to messages over their lifetimes, in other words labels are mutable. Labels help users organize their messages into subject areas. At any one time, the label state captures all labels that are active for a particular user. Labels will be described in greater detail below.

In the system 200, mail messages are accessed by using queries. This is in contrast to explicitly specifying subject folders as are used in many known mail systems. A query is composed one or more search terms, perhaps connected by logical operators, that can be used to retrieve messages. By specifying the name of a query, a user can easily retrieve messages related to a particular topic, phrase, date, sender, etc. Named queries 340 are stored as part of the account information.

Some queries can be designated as "filter" queries 340. This allows a user to screen, for example, "junk mail," commonly known as spam. Filter queries can also be used to pre-sort messages received from particular mailing lists. Query position information records which message the user last selected with a query. This way the user interface can position the display of messages with respect to the selected message when the query is reissued. User preferences 370 specify the appearance and functioning of the user interface to the mail service as implemented by the extended browser 116 of FIG. 1. Saved composition states 380 allow a user to compose and send a message using several different client computers while preparing the message.

The account manager 300 can generate a new account or delete an existing account. The account is generated ro a user by specifying the user name and password. Once a skeletal account has been generated, the user can supply the remaining information such as labels, named queries, filter queries, and so forth.

Mail Server

Now with continued reference to FIG. 2, the mail server system 200 receives (242) new mail messages by communicating with the mail server 240 using the POP-3 protocol. Mail messages are sent (241) using the SMTP protocol. The appropriate routing information in the mail server 240 for a particular user can be generated after the user's account has been generated. A "POP Account Name" should be specified as the user's name. In most systems, the name will be case sensitive. The "POP Host" should be the Internet domain name of the mail server 240. Here, the case of the letters is ignored. An IP address such as "16.4.0.16" can be used, although the domain name is preferred. In some cases, a particular user's preferred Internet e-mail address may be unrelated to the POP Account Name, or the POP Host. The mail server 240 is connected to the Internet by link 249.

The rapid expansion in the amount of information which is now available on-line has made it much more difficult to locate pertinent information. The question "in which folder did I store that message?," becomes more difficult to answer if the number of messages that one would like to save increases over long time periods to many thousands. The importance and frequency of accessed messages can vary.

Traditionally, the solution has been to structure the mail messages in a hierarchical manner, e.g., files, folders, sub-folders, sub-sub-folders, etc. However, it has been recognized that such structures do not scale easily because filing strategies are not consistent over time. Many users find that hierarchical structures are inadequate for substantial quantities of e-mail messages accumulated over many years. Particularly, since the meaning and relation of messages changes over time. Most systems with an explicit filing strategy require constant and tedious attention to keep the hierarchical ordering consistent with current needs.

Message Repository

Messages are stored in message files 400 and a full-text index. The organization of the message files is first described. This is followed by a description of the full-text index 500. As a feature of the present invention, user interaction with the mail messages is primarily by queries performed on the full-text index 500.

Figure 4:
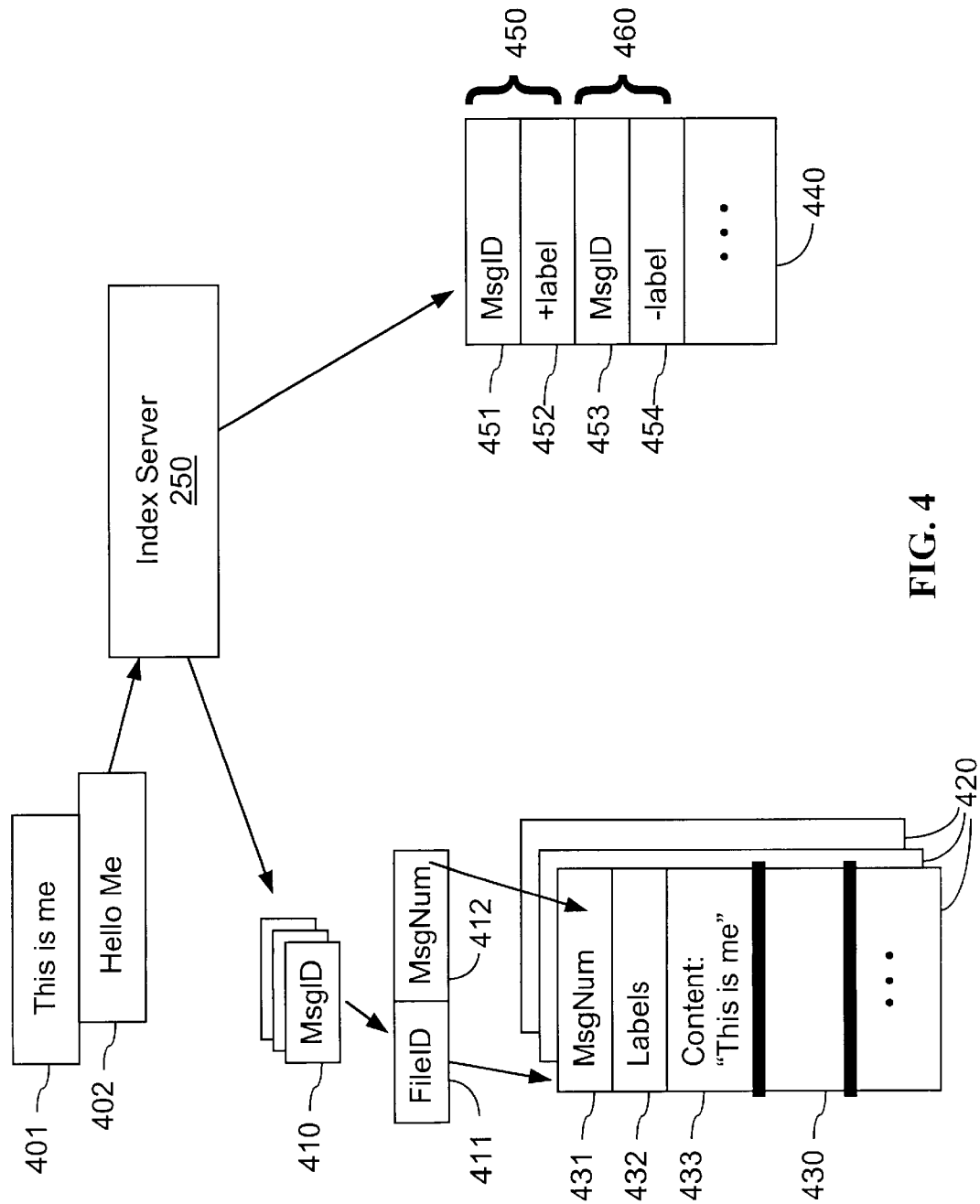
FIG. 4 is a block diagram of message and log files maintained by the system of FIG. 2.

As shown in FIG. 4, the index server 250 assigns each received message 401–402, a unique identification (MsgID) 410. The MsgID 410 is composed of a file identification (FileID) 411, and a message number (MsgNum) 412. The FileID "names," or is a pointer to a specific message file 420, and the MsgNum is some arbitrary numbering of messages in a file, e.g., an index into the file 420.

A message never changes after it has been filed. Also, the MsgID 410 forever identifies the same message, and is the only ID for the message. In the referenced message file 240, a message entry 430 includes the MsgNum stored at field 431, labels 432, and the content of the message itself in field 433.

The number of separate files 240 that are maintained for storing messages can depend on the design of the underlying file system and specific implementation details. For example, the size and number of entries of a particular file may be limited by the file system. Also, having multiple files may facilitate file maintenance functions such as back-up and restore.

Label Log

Although a message may never change, the set of labels associated with a message may change. Because labels can change, a transaction log 440 is also maintained. The log 440 includes "add" entries (+label) 450, and "remove" entries (−label) 460. Each entry includes the MsgID 451 or 453 of the effected message entry, and label that is being added (452) or deleted (453). The contents of the log 440 are occasionally merged with the message files 240. Merged entries are removed from the log 440. The label log 440 allows for the mutation of labels attached to data records such as mail messages, where the labels and the data which are labeled are stored in the same index.

Full-Text Index

Figure 5:
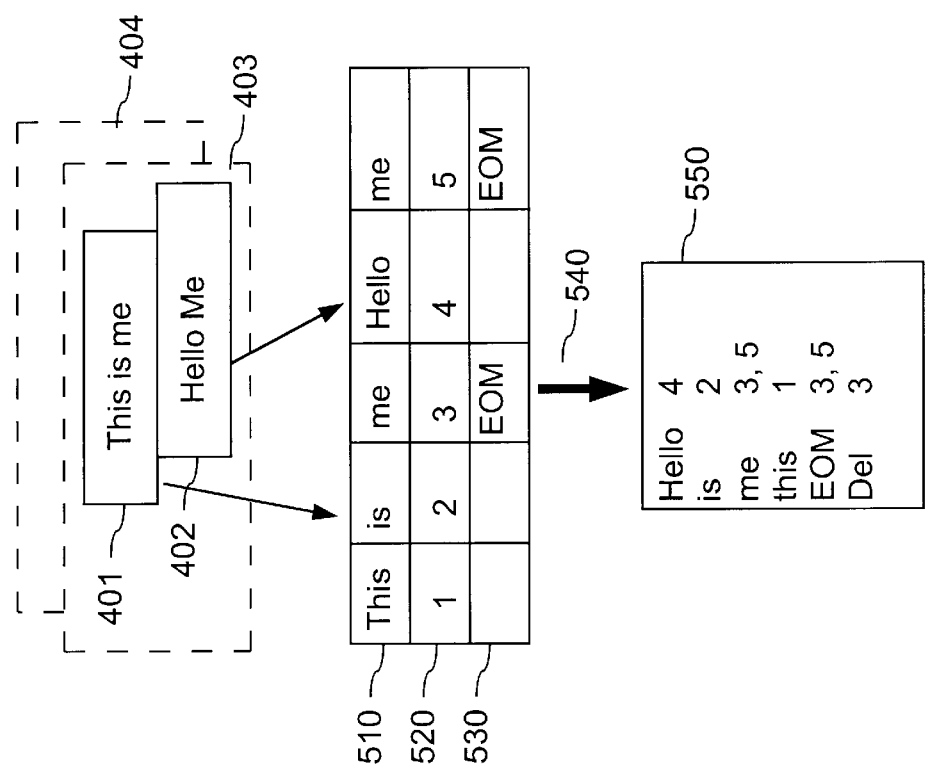
FIG. 5 is a flow diagram of a parsing scheme used for mail messages processed by the system of FIG. 2.
Figure 6:
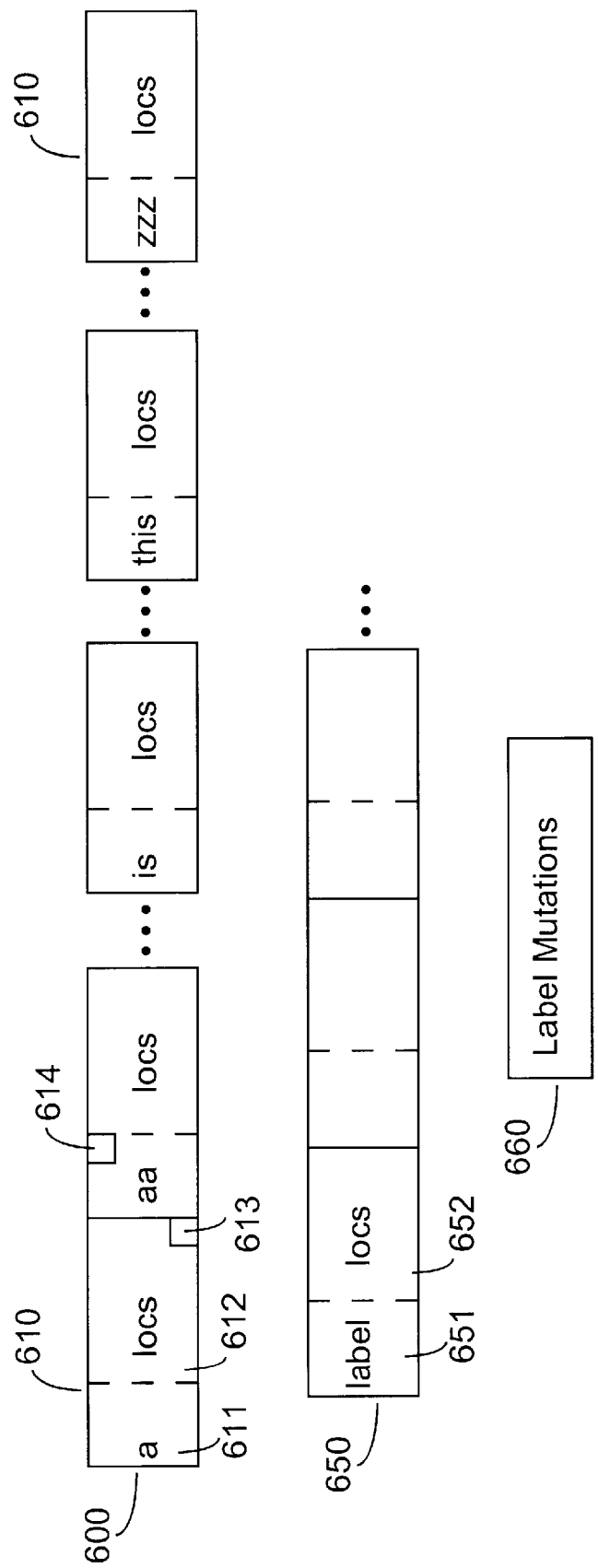
FIG. 6 is a block diagram of a full-text index for the message files of FIG. 4.

FIGS. 5 and 6 show how the index server 250 generates the full-text index 500. Newly received mail messages are processed in batches 403–404. Messages 401 and 402 of a batch are parsed into individual words 510. A batch 403 in a large mail service system may include hundreds or thousands of messages. The words of the messages are parsed in the order that they are received in a batch. Each word is arbitrarily assigned a sequential location number 520.

For example, the very first word of the very first message of the very first batch is assigned location "1," the next word location "2," and the last word location "3." The first word of the next message is assigned the next sequential location "4," and so forth. Once a location has been assigned to a word, the assignment never changes. If the location is expressed as a 64 bit number, then it is extremely unlikely that there will ever be an overlap on locations.

As the messages are parsed, the indexing process generates additional "metawords" 530. For example, an end-of-message (eom) metaword is generated for the last word of each message. The metawords are assigned the same locations as the words which triggered their generation. In the example shown, the location of the first eom metaword is "3," and the second is "5."

Other parts of the message, such as the "To," "From," "Subject," and "Date" fields may generate other distinctive metawords to help organize the full-text index 500. Metawords help facilitate searches of the index. Metawords are appended with predetermined characters so that there is no chance that a metaword will ever be confused with an actual parsed word. For example, metawords include characters such as "space" which are never allowed in words. Hereinafter, the term "words" means both actual words and synthesized metawords.

After a batch of messages have been parsed, the words and their assigned locations are sorted 540, first according to the collating order of the words, and second according their sequential locations. For example, the word "me" appears at locations "3" and "5" as shown in box 550. The sorted batch 550 of words and locations is used to generate the index. Each sorted batch 550 is merged into the index 500, initially empty.

Index Structure

FIG. 6 shows the logical structure of an index 600 according to the preferred embodiment. The index includes a plurality of word entries 610. Each word entry 610 is associated with a unique "word," that appeared at least once in some indexed message. The term "word" is used very loosely here, since the parsing of the words in practice depends on which marks/characters are used as word separators. Words do not need to be real words that can be found in a dictionary. Separators can be spacing and punctuation marks.

The indexer 250 will parse anything in a message that can be identified as a distinct set of characters delineated by word separators. Dates are also parsed and placed in the index. Dates are indexed so that searches on date ranges are possible. In an active index there may well be millions of different words. Therefore, in actual practice, compression techniques are extensively used to keep the files to a reasonable size, and allow updating of the index 500 as it is being used. The details of the physical on-disk structure of the index 600, and the maintenance thereof are described in U.S. patent application Ser. No. 08/695,060, "Web index," filed by M. Burrows on Aug. 9, 1996, now U.S. Pat. No. 5,832,500, incorporated in its entirety herein by reference.

The word entries 610 are stored in the collating order of the words. The word is stored in a word field 611 of the entry 610. The word field 611 is followed by location fields (locs) 612. There is one location field 612 for every occurrence of the word 611. As described in the Burrows reference, the locations are actually stored as a sequence of delta-values to reduce storage. The index 600 is fully populated. This means the last byte 614 of the last location field of a word is immediately followed by the first byte 615 of the next word field.

Labels

Labels provide a way for users to annotate mail messages. Attaching a label to a message is similar to affixing a note to a printed document. Labels can be used to replace the folder mechanisms used by many prior art mail systems. However, a single mail message can be annotated with multiple labels. This compares favorably to folder-based systems where a message can only be stored in a single folder.

Users can define a set of labels with which to work. The labels are nothing more than predefined text strings. The currently active set of labels for a particular user, e.g. the label state 330 of FIG. 3, is maintained by the account manager 300 and is displayed in a window of the graphical user interface. Labels can be added and removed by the system or by users.

As shown in FIG. 6, labels are stored in a data structure 650 that parallels and extends the functionality of full-text index 500. Labels are subject to the same constraints as index words. Also, queries on the full-text index 500 can contain labels, as well as words, as search terms. A label is added to a mail message by adding a specific index location (or locations) within the message to the set of locations referred to by the specified label. Label removal is the opposite. Operations on labels are much more efficient than other operations that mutate the state of the full-text index.

The on-disk data structure for the label index 650 that represents the label state 320 is the same as that described for index word entries 600. This means that the label state can be thought of as an extension of the full-text index 500. Accordingly, the label index extension, like the index 500, maps labels (words) 651 to sequences of index locations 652.

Although the structural formats of the label extension 650 and the full-text index 500 are the same, for efficiency reasons, the label portion of the index is managed by a software component that is distinct from the software that manages the full-text index 500. If a term of a query string is found to be a label, then the label index 650 is searched to provide the necessary location mapping. This mapping is further modified by the label log 440 that contains all recent label mutations (additions or removals). The label log 440 can include an in-memory version 660. Since operations on this structure are in-memory, updates for recent label mutations 660 can be relatively fast while the updating of the label index 650 can take place in background.

Figure 7:
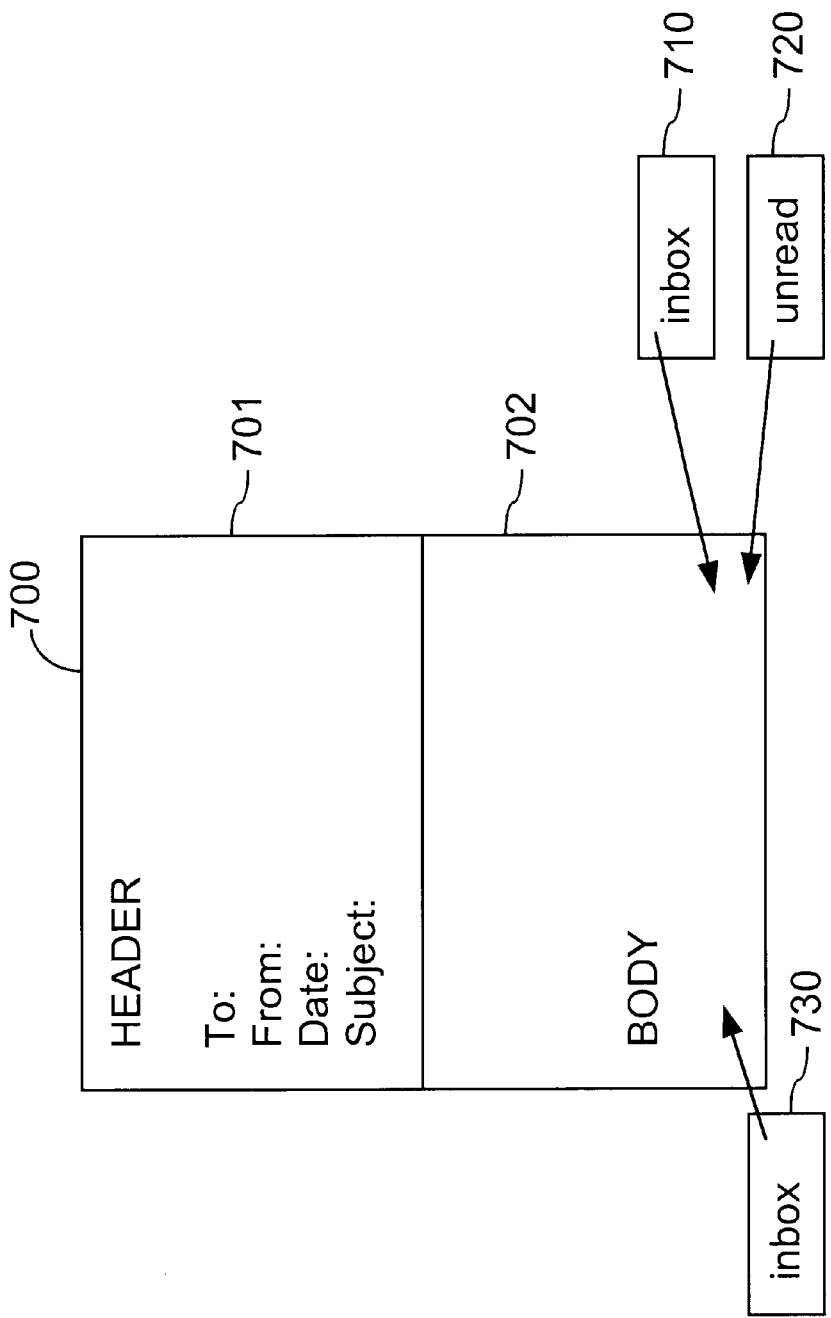
FIG. 7 is a diagram of a labeled message.

As shown in FIG. 7, a message 700 includes a header 701 and a body. The header 701 typically includes the "To", "From", "Date" and "Subject" fields. The header may also include routing information. The body 702 is the text of the mail message.

Each mail message can initially receive two labels, "inbox" 710 and "unread" 720. Messages labels as "unread" 720 have not yet been exposed for reading. Messages with the "inbox" label 710 are deemed to require the user's attention. As will be described below it is possible for messages to be labeled as unread but not have the inbox label. These less important messages can be read by the user as needed.

Outputting, e.g., displaying or printing, a message removes the unread label 720 under the assumption that it has been read. A user can explicitly add or remove the unread label. A message can be deleted by attaching a "delete" label 730. This has the effect that the message will not been seen again because messages labeled as deleted are normally excluded during searches. Removing the deleted label has the effect of "un-deleting" a message.

Although a preferred embodiment uses labels for data records that are mail messages, it should be understood that "mutable" labels can also be used for other types of data records. For example, labels which can be added and removed can be used with data records such as Web-pages, or news group notes. The key feature here being that labels are indexed in the same index as the record which they label, and that labels can be added and removed.

Queries

After e-mail messages have been indexed and labeled, the messages can be retrieved by issuing full-text queries. A query searches for messages that match on words and labels specified in the query. This is in contrast with known mail systems where users access mail by remembering in which file, folder, or sub-folder messages have been placed so the folder can be searched. As an advantage of the present system, users only need to recall some words and labels to find matching messages.

The syntax of the query language is similar as described in the Burrows reference. A query includes a sequence of primitive query terms, combined by operators such as "and," "or," "not," "near," and so forth. A primitive term can be a sequence of alpha-numeric characters, i.e., a "word," without punctuation marks. If the terms are enclosed without quotation marks ("), the search is for an exact match on the quoted string. A term can be a label. A term such as "from:fred" searches for messages with the word "fred" in the "from" field of a message header. Similar queries can be formulated for the "to," "from," "cc," and "subject" fields of the header.

A term such as "Nov. 2, 1996–Dec. 25, 1996" searches for all messages in the specified date range. The parsing of dates is flexible, e.g, Dec. 25, 1996, Dec. 12, 1996, and Dec. 25, 1996 all mean the same date. In the case of ambiguity (Feb. 1, 1996) the European order (day/month) is assumed.

During normal operation, the CGI program 220 modifies each issued query by appending a term which excludes the "deleted" label, e.g., "and not deleted." This has the effect of hiding all deleted messages from the user of the client. There is an option in the user interface which inhibits this effect to make deleted messages visible.

Named Queries

Queries can be "named." Named queries are maintained by the account manager 300. By specifying the name of a query, users can quickly perform a search for e-mail messages including frequently used terms. Users can compose complex queries to match on some pattern in indexed messages, perhaps intermixing conditions about messages having particular text or labels, and to keep the query for subsequent use.

Named queries can be viewed as a way for replacing prior art subject folders. Instead of statically organizing messages into folders according to predetermined conditions, queries allow the user to retrieve a specific collection of messages depending on a current set of search terms.

In other words, the conditions which define the collection are dynamically expressed as a query.

History List

Recently performed queries are kept in a "history" list. Accordingly, frequently performed queries can readily be re-issued, for example, when the index has been changed because of newly received mail, or because of actions taken by other client computers.

Dynamic Address Book

Queries can also be used to perform the function of prior art "address books." In many known e-mail systems, users keep address books of frequently used addresses. From time to time, users can add and remove addresses. There, the address books are statically maintained as separate data structures or address book files. For example, there can be "personal" and "public" related address books. In contrast, here, there is no separately stored address book. Instead, an "address book" is dynamically generated as it is needed. The dynamic address book is generated from the files 400 and the full-text index 500 as follows.

Figure 8:
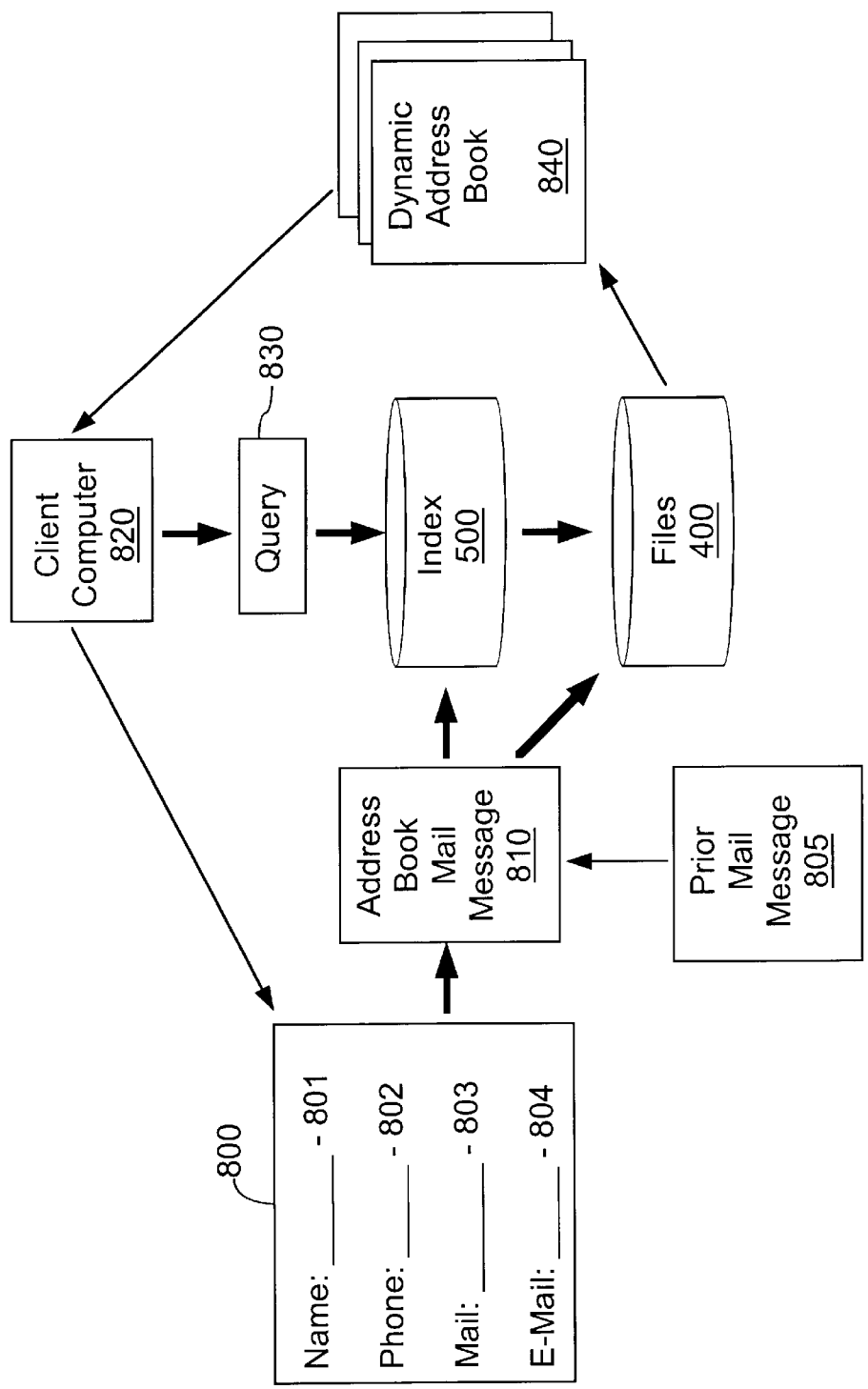
FIG. 8 is a diagram of an address book entry.

As shown in FIG. 8, a user of a client computer 820 can generate address book type information using a form 800 supplied by one of the client mail application programs 116. The form 800 includes, for example, entry fields 801–803 for address related information such as name, phone number, (hard-copy) mail address, and (soft-copy) e-mail address, and so forth. Alternatively, address information can be selected from a prior received mail message 805 by clicking on appropriate fields in the header or body of the message 805.

From the perspective of the mail service system 200 and the index server 250, the address book information is handled exactly as a received mail message. This means that, for example, the data of the fields 801–803 are combined into an "address book" mail message 810. An "address" label 809 can also be added to the entry using the labeling convention as described herein. The address book mail message 810 and label 809 can be stored in one of the message files 400. Additionally the message 810 can be parsed and inserted into the full-text index 500 as are the words and labels of any other mail message. In other words, the address information of form 800 is merged and blended with the full-text index 500.

After the address information has been filed and indexed, the address information can be retrieved by the user of the client computer 820 composing a query 830 using the standard query interface, with perhaps, the label "address" as one of the query terms. The exact content to be retrieved is determined at the time that the terms and operator of the query 830 are composed by the user. The address information, i.e., one or more address book mail messages, which satisfies the query is returned to the client computer 820 as the dynamic address book 840. The user can then select one of the addresses as a "to" address for a new, reply, or forward mail message.

Message Resemblance

It is also possible to search for messages which resemble a currently selected message. In this case a document resemblance technique can be used. Such a technique is described in U.S. patent application Ser. No. 08/665,709, Method for Determining Resemblance of Documents, filed by Broder et al. on Jun. 16, 1996, now U.S. Pat. No. 5,909,677, incorporated in its entirety herein by reference. This allows a user to find all messages which closely relate to each other.

Sorting Search Results

When a search for an issued query completes, the results of the search are presented in an order according to their MessageID 411, FIG. 4. In practice, this means that qualifying messages are presented in the temporal order of when the messages were received.

Most prior art e-mail systems allow other sort orders, such as by sender, or by message thread (a sequence of related messages). There is no need for such capabilities here. Consider the following possibilities.

Messages from a particular user can be specified by including in a query a term such as "from:jones." This will locate only messages from a particular user. You can select messages of a particular "thread" by using the "view discussion" option of the user interface described below. As stated above, messages for a particular date range can be specified in the query.

Filtering Messages

Figure 9:
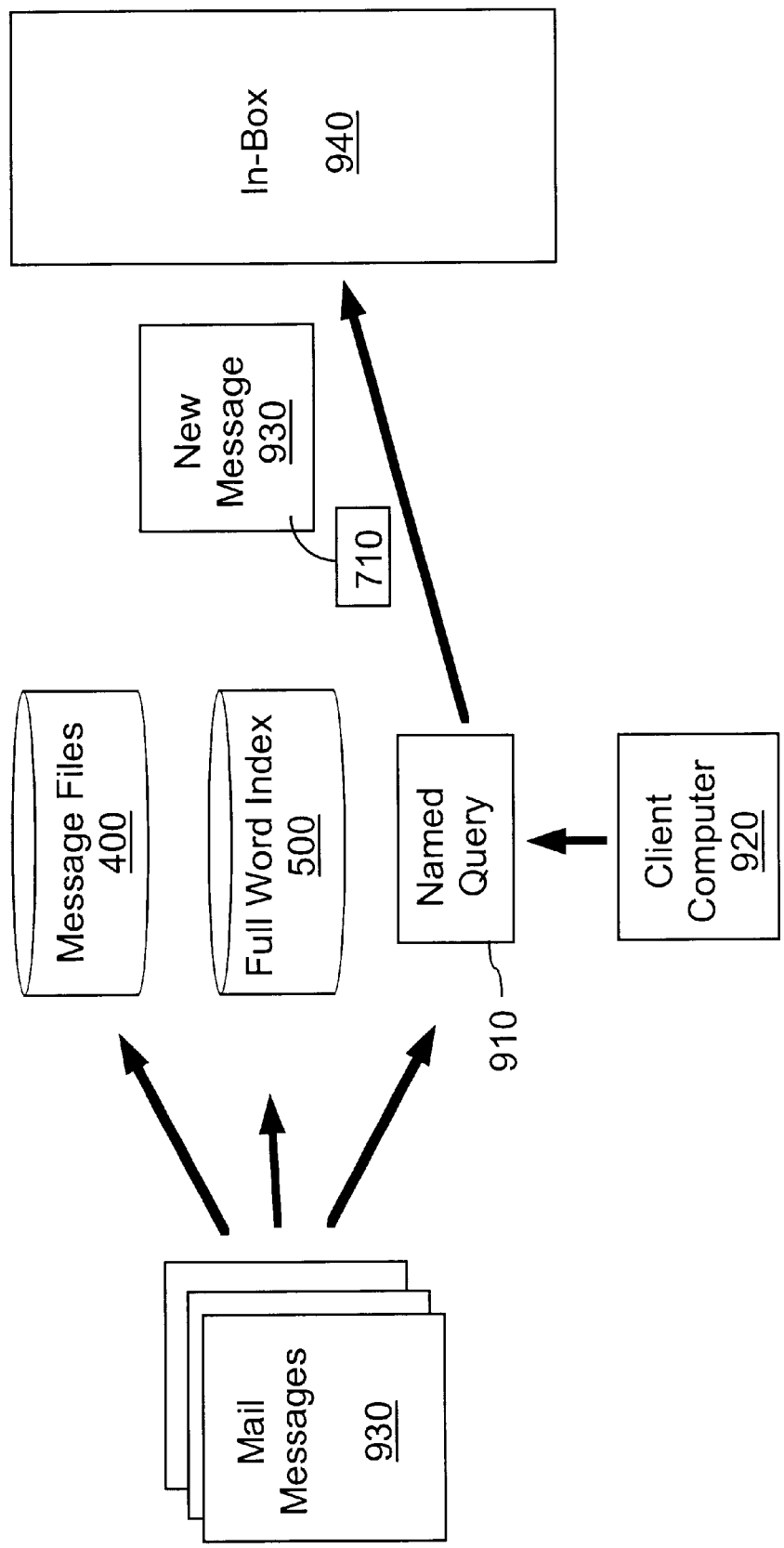
FIG. 9 is a flow diagram for filtering queries.

In order to facilitate mail handling, particularly for someone receiving a large amount of e-mail, a user can configure the filter 280 to his or her own preferences as shown in FIG. 9. A message filter is specified as one or more name "filter" queries 910. The named query 910 is stored as part of the account information of FIG. 3. The named filter query 910 can be composed on a client computer 920 using the client mail application programs down-loaded from the mail service system 200.

New messages 930 received by the mail service system 200 are stored, parsed, and indexed in the message files 400 and full-text index 500 as described above. In addition, each new message 930 can be compared with the named queries 910. If the content of a new message 930 does not match any of the named filter queries 910, then the new message 930 is given the inbox label 710 and the unread label 720, i.e., the message is placed in the "In-box" 940 for the user's attention. Otherwise, the new message 920 is only given the unread label 720.

For example, mail which is sent out typically has a "from" field including the name of the sender, e.g., "From: Jon Doe," in the message header. Alternatively, the body of the mail message may include the text, "You are getting this message from your good friend Jon Doe." The user Jon Doe can set up a named filter query "SentByME" as "From near (Jon Doe)". This query will match any message which contains the word "from" near the word phrase "Jon Doe." The effect is that users do not explicitly become aware of messages that match on the filter query 910. For example, a user may want to filter messages which are "cc" copies to one self. A user may also desire to filter out junk e-mail messages arriving from commercial e-mail distributors at known domains, or pre-sort messages received via mailing lists.

Message Display Options

From the user's perspective, access to the mail services is implemented by extensions to the Web browser, such as Java applets. Messages are normally displayed by their primary component being transmitted to the client in the HTML format, and being displayed in the Java applet's window. The first line of a displayed message contains any "hot-links" which the user can click to display the message in one of the Web browser's windows, either with the HTML formatting, or as the original text uninterpreted by the system.

It should be noted, headers in Internet messages, depending on routing, can be quite lengthy. Therefore, it is possible to restrict the view to just the "from," "to," "cc," "date," and "subject" fields of the header.

Embedded Links

When displaying retrieved messages, the system 200 heuristically locates text strings which have the syntax of e-mail addresses. If the user click on one of these addresses, then the system will display a composition window, described below, so that the user can easily generate a reply message to the selected e-mail address(es).

Similarly, when displaying retrieved messages, the system 200 heuristically locates text strings that have the syntax of an URL, and makes the string a hot-link. When the user clicks on the hot-link, the URL is passed to the browser, which will retrieve the contents over the network, and process the content in the normal manner.

The system also attempts to detect components in messages, such as explicitly "attached" or implicitly "embedded" files. The files can be in any number of possible formats. The content of these files are displayed by the browser 115. The specific display actions used will depend on how the browser is configured to respond to different component file formats.

For some file formats, for example GIF and JPEG, the component can directly be displayed. It is also possible to configure the browser with a "helper" applet to "display" attached files having specific format types as "icons." For example, the message may be in the form of an audio message, in which case, the message needs to be "said," and not displayed. For some message formats, the browser may store some of the content in file system of the client computer.

Low-Bandwidth Filtering

Since the client computers 111–113 may access the mail service system via low-bandwidth network connections, an attempt is made to minimize the amount of data that are sent from the mail service system to the client computers. Even over high-speed communications channels, minimizing the amount of network traffic can improve user interactions.

Because the mail service system 200 allows mail messages to include attached or embedded multi-media files, mail messages can become quite large. In the prior art, the entire mail message, included files are typically shipped to the client computer. Thus, any part of the mail message can immediately be read by the user after the message has been received in the client.

Figure 10:
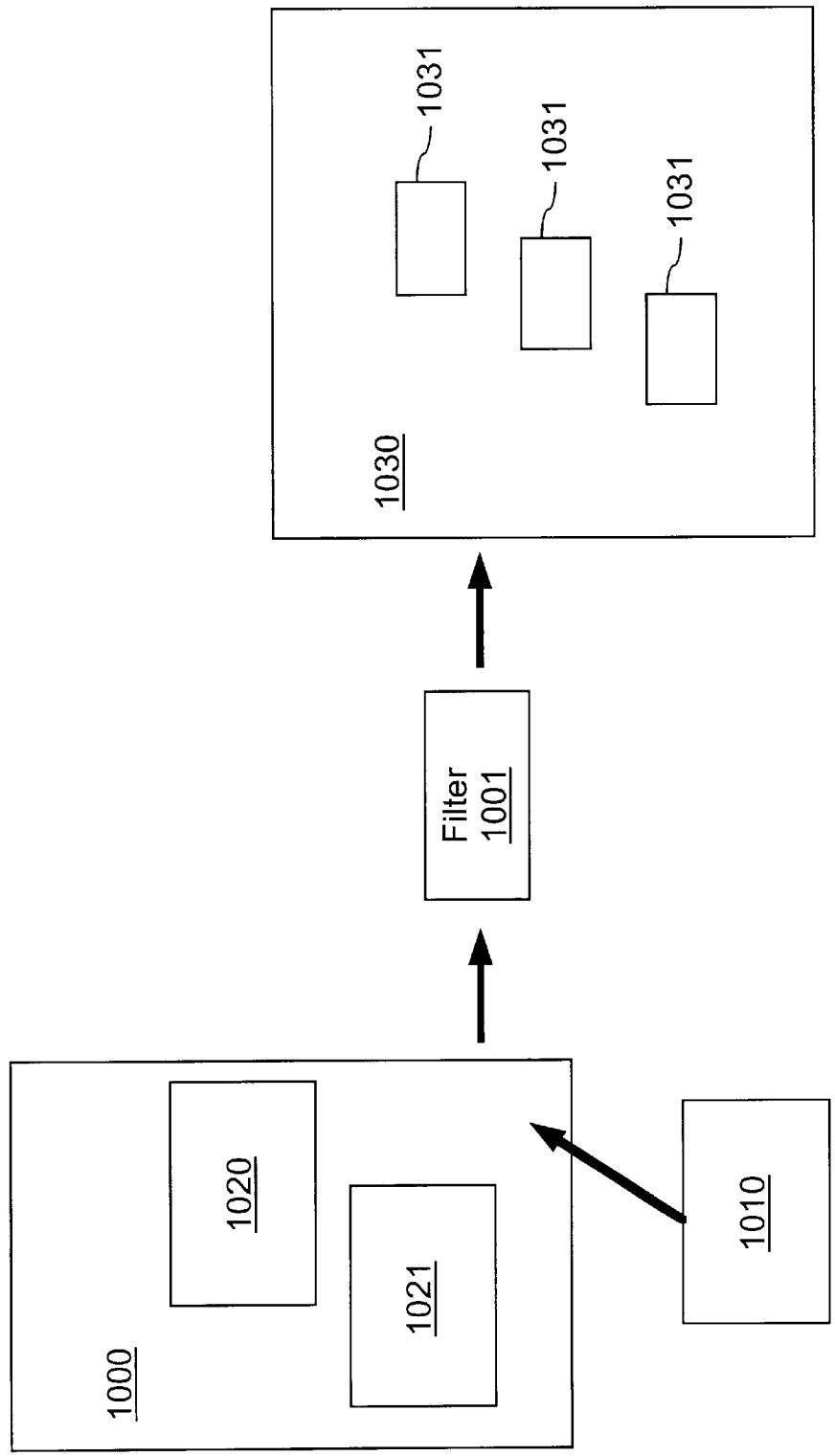
FIG. 10 is a block diagram for a MIME filter.

As shown in FIG. 10, the mail service 200 can recognize message components that are included as such. The system 200 can discover an explicitly attached file 1010 to a message 100, and the system can also heuristically discover textual components 1020–1021 that are implicitly embedded without MIME structuring in the message. For example, the system 200 can recognize embedded "uuencoded" enclosures, base 64 enclosures, Postscript (and PDF) documents, HTML pages, and MIME fragments.

Accordingly, the system 200 is configured to "hold-back" such components 1010, 1020–1021 encoded in different formats using a "MIME" filter 1001. The attached and embedded components are replaced by hot-links 1031 in a reduced size message 1030. Only when the user clicks on one of the hot-links 1031 is the component sent to the requesting client computer.

Client Computer User Interface

The following sections described how the Web browser 115 is configured to provided the e-mail services of the system 200. The functions described can be displayed as pull-down menus, or as button bars depending on a desired appearance. Preferably, the functions are implemented as Java applets.

File Menu

The file menu has the following options, Administration, Preferences, and Quit. If the user clicks on the Administration option button, then the system 200 loads the system administrative page into the browser 116. Using the Administrative window, subject to access controls, the user can view and modify accounts, and view the server log files. The preferences option is used to modify user preferences 370. Quit returns to the main log-in window.

Queries Menu

This menu includes the View Discussion, Name Current Query, Forget Named Query, Exclude "deleted" Message, and Your Query Options. The View Discussion option issues a query for messages related to the currently selected message. Here, "related" means any messages which share approximately the same subject line, and/or being in reply to such a message, or messages linked by a common standard "RFC822" message ID.

The Name Current Query allows a user to attach a text string to the current query. This causes the system 200 to place the query in the account for the user for subsequent use. The Forget Named Query option deletes a named query.

The Excluded "deleted" message option omits from a query result all messages that have the deleted label. This is the default option. Clicking on this option changes the behavior of the system 200 to include, in response to a query, "deleted" messages. The Your Named Queries option displays a particular user's set of named queries 340. Clicking on any of the displayed names issues the query.

Labels Menu

This menu includes the Record label and Forget Label options. These options respectively allow for the addition and removal of labels to and from the label state 330.

History Menu

The client keeps a history of, for example, the last ten queries to allow for the reissue of queries. The options of this menu are Go Back, Redo Current Query, Go Forward, and The History List. Go Back reissues the query preceding to the current query. Redo reissues the current query. This option is useful to process messages which have recently arrived, or in the case where the user's actions have altered the messages files 400 in some other manner. Go Forward reissues the query following the current query. The History List displays all of the recently issued queries. Any query listed can be reissued by clicking on the query.

Messages Menu

Options here include: Select All, Select Unread, Select Read, Mark As Unread, Mark As Read, Add Labels, Remove Labels, and Use Built-in Viewer. The Select All option selects all messages which match the current query. The next two options respectively select message that do not, and do have the unread label. The following two options add and remove labels label to currently selected messages.

The user interface normally displays a message by converting the message to an HTML format and presenting it to an HTML viewer which can either be in the browser's main window, or with a built-in viewer. The last option of the message menu selects the viewer.

Help Menu

The help options can be used to display informational pages on how to use the various features of the system. The help pages are down-loaded on demand into the client computer from the mail service system 200.

Main Window Menu Bar

This menu bar includes buttons for the following functions. The functions are enabled by clicking on the button.

Add: This button is used to add a selected label to a message.
Relabel: This button combines the functions of the unlabel and add functions.
Delete: With this button, a deleted label is added to a message.
Unlabel: Used to remove a single label mentioned in a query from a message.
Next: Selects a next message.
Prev: Selects a preceding message.
Newmail: Issues a query for all message having the inbox label.
Query: Presents a dialog to compose and issue a query.

Message Display Button Bar

This button bar is used to perform the following functions.

Detach: Generate a new top-level window to display selected messages.
Compose: Generate a window for composing new mail messages.
Forward: This function sets up a window for composing a new message. A selected message is attached to the new message. The attached messages are forwarded without the need of down-loading the messages to the client computer.
Reply To All: This function sets up a window for composing a new message with the same recipients as those in a selected message.
Reply To Sender: Set up a window for composing a new message to the sender of a selected message.

Composition Window

Access to the composition window is gained by clicking on the Compose, Forward, Reply, or Modify button, or by clicking on a "mail-to" hot link in a displayed message. Compose begins a new message, forward is used to send a previously received message to someone else, reply is to respond to a message, and modify allows on to change a message which has not yet been sent. The mail service allows a user to compose multiple messages at a time.

The text of a message is typed in using an available composition window, or generating a window if none are available. The exact form of the typing area of the composition window depends on the nature of the windowing system used on a particular client computer. Typically, while typing the user can use short-cuts for editing actions such as cut, paste, copy, delete, undo, and so forth.

Text portions from another message can be inserted by using the Insert Msg, or Quote Msg buttons. If an entire message is to be included, then the Forward button should be used. The message will not actually be posted until the send function is selected. While the message is being composed, it is periodically saved by the mail system. Thus, a composition session started using one client computer in an office, can easily be completed some time later using another computer.

Send: Sends a message. Any attachments are included before sending the message. The user is notified of invalid recipients by a status message, and editing of the message can continue. Otherwise, the window is switched to read-only mode.

Close: After a message has been sent, or the discard button is clicked, this button replaces the send button to allow one to close the composition window.

Discard: This button is used to discard the message being composed, and switches the window to read-only. A user can then click the close or modify buttons.

Modify: After a message has been successfully sent, or if the discard button has been clicked, this button appears in place of the discard button to allow the user to compose another message derived from the current message.

Wrap: This function is used to limit the number of characters on any one line to eighty, as required by some mailing systems.

Insert Msg: Replace the selected text with displayed text from a selected message.

Quote Msg: Replace the selected text with displayed text from a selected message so that each line is preceded by the ">" character.

Having described a preferred embodiment of the invention, it will now become apparent to one skilled in the art that other embodiments incorporating its concepts may be used. It is felt therefore, that this embodiment should not be limited to the disclosed embodiment, but rather should be limited only by the spirit and the scope of the appended claims.

We claim:

1. An apparatus for accessing and organizing electronic mail messages, comprising:

a first memory storing mail messages;

means for adding and removing labels associated with mail messages, including system means for automatically adding and removing labels to and from mail messages by the system, and user means for adding labels to and removing labels from mail messages in accordance with user commands;

a second memory storing a full-text index of the mail messages stored in the first memory and for storing a label index denoting mail messages associated with the labels; means for updating the full-text index and the label index when messages are added to the first memory, and means for updating the label index when labels are added to and removed from messages;

means for accessing the mail messages using queries composed on client computers connected to the first and second memories by a network the queries searching the full-text index and the label index to locate mail messages satisfying the queries, the mail messages satisfying the queries including messages stored in the first memory prior to at least a subset of the queries being composed on the client computers; and means for sending the located mail messages to the client computers over the network.

2. The apparatus of claim 1 wherein the full-text index comprises a set of entries for distinct words in the mail messages, each entry specifying locations of the corresponding word in the mail messages.

3. The apparatus of claim 1 wherein the full-text index comprises a set of entries for distinct words in the mail messages, each entry specifying mail messages in which the corresponding word is located.

4. The apparatus of claim 1 wherein the label index comprises a set of entries for distinct labels in the mail messages, each entry specifying mail messages to which the corresponding label has been added.

5. The apparatus of claim 1 including means for maintaining a label state for each of a plurality of users, each label state representing all active labels associated with a respective user of the plurality of users.

6. The apparatus of claim 1 wherein the means for adding and removing labels leaves the mail messages unchanged and stores information concerning the labels associated with a mail message in the label index.

7. The apparatus of claim 1 wherein each mail message includes a header and a body, and further including means for parsing the header and the body into words, means for associating a unique location with each parsed word, and storing the words and their associated unique locations in the second memory as the full-text index.

8. The apparatus of claim 7 wherein the words and their associated locations are stored first according to a collating order of the words, and second according to a collating order of the unique locations.

9. The apparatus of claim 7 wherein the messages are parsed into words according to predetermined word separators.

10. The apparatus of claim 1 wherein the first memory is partitioned into a plurality of files, and each mail message is uniquely identified by a message identification.

11. The apparatus of claim 10 wherein the unique message identification includes a file identification identifying one of the plurality of files and a message number.

12. The apparatus of claim 10 further including means for merging a label log file with the plurality of files.

13. A method for accessing and organizing electronic mail messages, comprising the steps of:

storing mail messages in a first memory;

storing a full-text index of the mail messages in a second memory;

adding and removing labels associated with mail messages and storing the labels and locations associated with the labels in a third memory including automatically adding and removing labels to and from mail messages by the system, and adding and removing labels to and from mail messages in accordance with user commands;

storing a label index denoting mail messages associated with the labels;

updating the full-text index and the label index when messages are added to the first memory;

updating the label index when labels are added and removed to and from messages;

accessing the mail messages using queries composed on client computers connected to the first and second memories by a network, the queries searching the full-text index and the label index to locate mail messages satisfying the queries, the mail messages satisfying the queries including messages stored in the first memory prior to at least a subset of the queries being composed on the client computers; and sending the located mail messages to the client computers over the network.

14. The method of claim 13 wherein the full-text index comprises a set of entries for distinct words in the mail messages, each entry specifying locations of the corresponding word in the mail messages.

15. The method of claim 13 wherein the full-text index comprises a set of entries for distinct words in the mail messages, each entry specifying mail messages in which the corresponding word is located.

16. The method of any of claim 13 wherein the label index comprises a set of entries for distinct labels in the mail messages, each entry specifying mail messages to which a label, corresponding to the label index entry, has been added.

17. The method of claim 16 wherein each entry of the label index specifies locations within one or more mail messages to which a label, corresponding to the label index entry, has been added.

18. The method of claim 13, further including maintaining a label state for each of a plurality of users, each label state representing all active labels associated with a respective user of the plurality of users.

19. The method of claim 13, wherein said adding and removing of labels associated with messages leaves the messages unchanged and stores information concerning the labels associated with a message in the label index.

20. The method of claim 13 further including the steps of partitioning the first memory into a plurality of files, and uniquely identifying each mail message by a message identification.

21. The method of claim 20 wherein the unique message identification includes a file identification identifying one of the plurality of files and a message number.

22. The method of claim 20 further including merging a label log file with the plurality of files.

23. The method of claim 13 wherein each mail message includes a header and a body, and further including the steps of parsing the header and the body into words, associating a unique location with each parsed word, and storing the words and their associated unique locations in the second memory as the full-text index.

24. The method of claim 23 further including storing the words and their locations associated first according to a collating order of the words, and second according to a collating order of the unique locations.

25. The method of claim 23 further including parsing the messages into words according to predetermined word separators.

* * * * *